(12) United States Patent
Nortmann et al.

(10) Patent No.: US 8,919,868 B2
(45) Date of Patent: Dec. 30, 2014

(54) FRONT END FOR A MOTOR VEHICLE

(71) Applicant: Volkswagen Aktiengesellschaft, Wolfsburg (DE)

(72) Inventors: Ansgar Nortmann, Gifhorn (DE); Thorben Bösche, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/891,818

(22) Filed: May 10, 2013

(65) Prior Publication Data
US 2013/0300152 A1 Nov. 14, 2013

(30) Foreign Application Priority Data

May 10, 2012 (DE) .......................... 10 2012 009 307

(51) Int. Cl.
  *B62D 25/04* (2006.01)
  *B62D 25/08* (2006.01)
  *B62D 21/15* (2006.01)
(52) U.S. Cl.
  CPC .............. *B62D 21/155* (2013.01); *B62D 25/04* (2013.01); *B62D 25/08* (2013.01); *B62D 21/157* (2013.01)
  USPC ................................... 296/193.06; 296/187.1
(58) Field of Classification Search
  CPC ....... B62D 21/155; B62D 25/04; B62D 25/08
  USPC ............... 296/193.06, 187.09, 187.1, 203.02, 296/203.03
  See application file for complete search history.

(56) References Cited

U.S. PATENT DOCUMENTS

| 5,042,872 A | 8/1991 | Yoshii |
| 5,586,799 A * | 12/1996 | Kanemitsu et al. ...... 296/203.02 |
| 2003/0102695 A1 | 6/2003 | Kim |

FOREIGN PATENT DOCUMENTS

| DE | 41 39 305 | 6/1992 |
| DE | 196 18 622 | 5/1997 |
| DE | 100 63 509 | 7/2002 |
| DE | 102 44 621 | 6/2003 |
| DE | 10 2008 036 868 | 2/2010 |
| JP | 9 226 622 | 9/1997 |

OTHER PUBLICATIONS

Search Report issued for German Patent Application No. 10 2012 009 307.1, dated Dec. 17, 2012.

* cited by examiner

*Primary Examiner* — Dennis H Pedder
(74) *Attorney, Agent, or Firm* — Pearl Cohen Zedek Latzer Baratz LLP

(57) ABSTRACT

The invention relates to a front end for a vehicle, in particular a motor vehicle, which has diametrically opposed A pillars (12) in the vehicle transverse direction (y), of which each A pillar (12) is constructed with an internal sheet metal molded part (31) and an external sheet metal molded part (29) which are connected to each other, in particular welded, via edge flange joints (35), the A pillar additionally being connected to at least one tension element (37) whose outer end (39) in the vehicle transverse direction (y) is connected, in particular, to a hinge element (45) mounted on the external sheet metal molded part (29) and whose inner end (43) is connected to the internal sheet metal molded part (31). According to the invention, the inner end (43) of the tension element (37) is fastened between the internal sheet metal molded part (31) of the A pillar (12) and a counter-holder (55) in at least one three-layer structure (57).

10 Claims, 5 Drawing Sheets

FRONT END FOR A MOTOR VEHICLE

CROSS-REFERENCE TO RELATED APPLICATIONS

This application is claims priority from German Patent Application No. 10 2012 009 307.1, filed May 10, 2012, which is hereby incorporated by reference.

FIELD OF THE INVENTION

The present invention relates to a front end for a vehicle, in particular a motor vehicle, according to the definition of the species in Patent Claim 1.

BACKGROUND OF THE INVENTION

In a vehicle collision with only a minor lateral overlap, the problem arises that the collision forces are not directly applied to the front bumper cross member and on to the vehicle longitudinal member. Instead, in this special accident constellation, the force is applied past the bumper cross member via the side body top shell and, in particular, via the vehicle wheel facing the crash onto the upper and lower A pillar nodes located therebehind, from which the applied collision forces are transferred farther to the vehicle door as well as to the side sills adjoining the footwell.

A front end for a vehicle according to the definition of the species is known from DE 10 2008 036 868 A1. This front end has diametrically opposed A pillars, viewed in the vehicle transverse direction. Each of these A pillars is designed as a hollow profile and has an internal sheet metal molded part and an external sheet metal molded part, which are spot-welded to each over via edge flange joints. In the area of the upper A pillar node, a hinge element for a motor vehicle door is attached to the external sheet metal molded part. To provide a structurally rigid connection, the hinge element is mounted on a bolt-like torque support, which extends through the cavity of the A pillar to the internal sheet metal molded part of the A pillar and is welded on its inside.

In the special accident constellation described above, with only a minor lateral overlap, a tensile/shear load may act, in particular, upon the flange joints between the internal and external sheet metal molded parts of the A pillar. This may cause the flange joints to break apart and the external sheet metal molded part of the A pillar to bulge sideways to the outside.

A hinge fastener on a vehicle body is known from DE 100 63 509 A1, in which a hinge element for the vehicle door is supported via a reinforcing part. The reinforcing part extends through the cavity of the A pillar and is fastened on the inside of the internal sheet metal molded part and on the inside of the external sheet metal molded part of the supporting pillar.

SUMMARY OF THE INVENTION

The object of the present invention is to provide a front end for a vehicle, in which the deformation behavior of the vehicle in a vehicle collision is improved.

The object is achieved by the features of Patent Claim 1. Preferred refinements of the present invention are disclosed in the subclaims.

The present invention is based on the finding that, in a vehicle collision with a minor lateral overlap, the affected A pillar is subjected to a higher shear load or a tensile load acting in the vehicle transverse direction, whereby the flange joint between the internal and external sheet metal molded parts of the A pillar is at risk of breaking apart. Against this background, the flange joints of the A pillar are strain-relieved according to the present invention. The A pillar may thus withstand an increased, accident-induced application of force nearly fault-free. According to a characterizing part of the present invention, a tension element is provided for this purpose, which extends between the internal and the external sheet metal molded parts. The outer end of the tension element in the vehicle transverse direction is preferably connected to a hinge element mounted on the external sheet metal molded part. The inner end of the tension element, in contrast, is connected to the internal sheet metal molded part. According to the present invention, the internal end of the tension element is welded onto the internal sheet metal molded part not only by a simple welded joint, but it is also an integral part of a three-layer structure, in which the inner end of the tension element is inserted in a form-locked manner between the internal sheet metal molded part of the A pillar and an additional counter-holder.

The tension element according to the present invention therefore performs a dual function. During normal vehicle operation, it is a reinforcing part which ensures a positionally accurate arrangement of the hinge element. In a vehicle collision, the tension element provides an additional force path, by means of which the flange joints of the A pillar are strain-relieved. The special component-fixed connection to the internal sheet metal molded part ensures that the tension element does not break away from the internal sheet metal molded part but instead is able to withstand a greater accident-induced application of force.

The tension element may be preferably situated within the cavity between the internal sheet metal molded part and the external sheet metal molded part, protecting it from external mechanical influences. The inner and outer ends of the tension element are connected, in particular, via welded joints and/or via an adhesive or screw connection. According to the present invention, the inner end of the tension element is thus integrally attached to the internal sheet metal molded part of the A pillar, on the one hand, by an adhesive connection or welded joint. On the other hand, the tension element is also attached in a form-locked manner between the internal sheet metal molded part and an additional counter-holder. This means that, even if the form-locked connection breaks, the tension element remains mounted on the internal sheet metal molded part by the form-locked connection, which may provide a strain relief in the vehicle transverse direction.

To create the three-layer structure, it is particularly preferred if the inner end of the tension element is fed out from the A pillar cavity through a feed-through opening in the internal sheet metal molded part and is able to engage with the internal sheet metal molded part. In this case, the counter-holder is situated outside the A pillar cavity. For example, the counter-holder may be a sheet metal component which is attached to the A pillar from the inside in the vehicle transverse direction, for example using a welded, adhesive or screw connection.

It is particularly preferred if the counter-holder is not a separate sheet metal part but instead is an integral part of a transverse assembly which extends between the two A pillars in a force-fitted manner. In this way, the impact energy may be at least partially introduced into the transverse assembly via the counter-holder by inserting the counter-holder therebetween. The transverse assembly extending between the two A pillars may be implemented as a one-piece welded assembly, in which a module cross member, an end wall limiting the vehicle interior and/or a radiator tank housing is/are integrated, for example.

The transverse assembly may have predefined connecting profiles on each of its two sides, to which corresponding connecting profiles of the A pillar may be attached, for example by a welded connection. The counter-holder may be specially implemented as a flange section of the connecting profile of the transverse assembly. In the assembled position, the inner end of the tension element may in this case be interposed, sandwiched, in a form-locked manner in the vehicle transverse direction between this flange section of the transverse assembly and the internal sheet metal molded part of the A pillar.

The transverse assembly and an A pillar may be assembled as follows: The inner end of the tension element is first connected (welded) to the flange section of the connecting profile of the transverse assembly. The connecting profile of the internal sheet metal molded part is then connected to the corresponding transverse assembly connecting profile, forming the three-layer structure in which one sheet metal section of the internal sheet metal molded part comes into contact with the inner end of the tension element. The external sheet metal molded part of the A pillar is subsequently connected to the internal sheet metal molded part using a flange joint.

By way of example, the tension element may be a bolt-shaped component or a sheet metal component, which is preferred for manufacturing reasons. The sheet metal component may have angled edge flanges on each of its inner and outer ends, which are connectable to the sheet metal molded parts of the A pillar. It is particularly preferred if the tension element designed as a sheet metal component is a groove-shaped component having a groove base and laterally raised side walls. The groove base may form the outer end of the tension element, which is in contact with the inside of the external sheet metal molded part. Edge flanges, which form the inner tension element ends, may be angled at the two side walls of the groove-shaped sheet metal component.

The geometries of the tension element as well as the feed-through opening of the internal sheet metal molded part may preferably be matched to each other in such a way that a slight clearance is provided between the tension element and the edge of the feed-through opening in the vehicle longitudinal direction. In the event of a crash, the tension element may be pressed in until the clearance is filled and the tension element strikes the edge of the feed-through opening of the internal sheet metal molded part and thereby provides another force path, whereby collision forces may be applied from the external sheet metal molded part of the A pillar to the internal sheet metal molded part via the tension element in the vehicle longitudinal direction.

The advantageous embodiments and/or refinements of the present invention explained above and/or illustrated in the subclaims may be used individually or in any combination with each other except in cases where unmistakable dependencies or incompatible alternatives exist.

BRIEF DESCRIPTION OF THE DRAWINGS

The present invention and its advantageous embodiments and refinements as well as their advantages are explained in greater detail below on the basis of drawings.

DETAILED DESCRIPTION OF THE INVENTION

Figure 1:
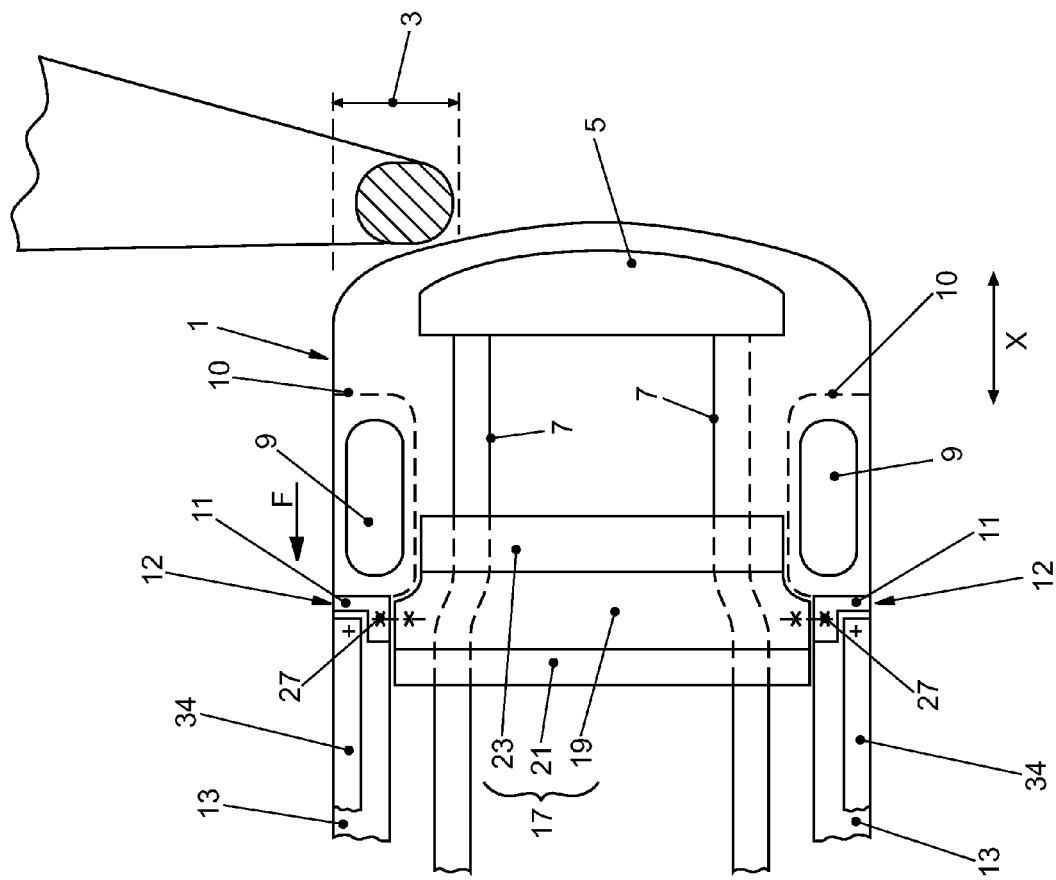
FIG. 1 shows a roughly schematic view from above of a pole crash test setup for carrying out a frontal collision with a minor overlap.

FIG. 1 shows a test setup which may be used to carry out a pole crash with a motor vehicle 1. Using the illustrated test setup, a vehicle collision with only a minor lateral overlap 3 may be simulated, in which the impact surface on the vehicle is largely located laterally on the outside of an indicated front bumper cross member 5. For reasons of clarity, only the components necessary to understand the present invention are indicated in motor vehicle 1. Thus, two vehicle longitudinal members 7 adjoin bumper cross member 5 toward the back in vehicle longitudinal direction x. In vehicle transverse direction y, vehicle longitudinal members 7 are guided past front wheels 9 on the inside. Wheel housings 10 of front wheels 9 indicated by the dashed line are each limited to the back by A pillars 12 in vehicle longitudinal direction x, only upper A pillar nodes 11 in each case being illustrated in FIG. 1. An upper longitudinal member 15 (only indicated in FIG. 5) as well as a transverse assembly 17 converge in upper A pillar node 11, a module cross member 19 and an end wall 21 and/or a radiator tank 23 being integrated into transverse assembly 17 by way of example. According to FIG. 1, transverse assembly 17 extends between the two diametrically opposed A pillars 12. Transverse assembly 17 has a connecting profile 25 (FIGS. 2 through 4) on each side, which is connected to respective facing A pillar 12 by a fixed, force-fitted connection 27 (FIG. 1).

Figure 2:
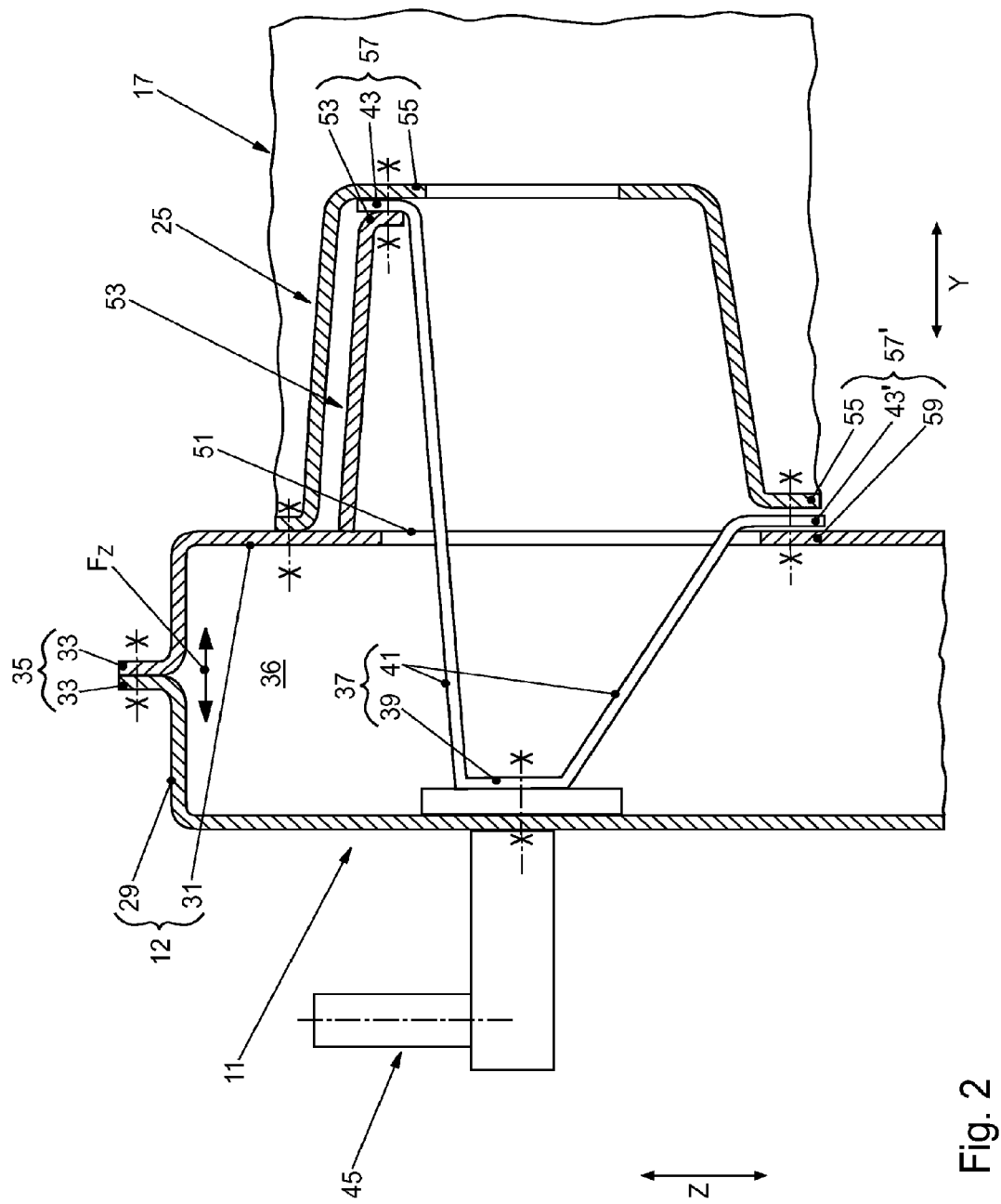
FIG. 2 shows an enlarged sectional representation along sectional plane I-I from FIG. 1.

FIG. 2 shows a greatly enlarged schematic sectional representation of upper A pillar nodes 11. Accordingly, A pillar 12 is designed as a hollow profile having two shell-type, internal and external sheet metal molded parts 29, 31. Sheet metal molded parts 29, 31 have laterally raised profile edges with angled edge flanges 33. In the assembled state in FIG. 2, these edge flanges are welded together, i.e., spot welded, in flange joint 35. In addition to aforementioned flange joint 35, the two internal and external sheet metal molded parts 29, 31 are connected to each other in a force-transmitting manner with the aid of a tension element 37.

Figure 3:
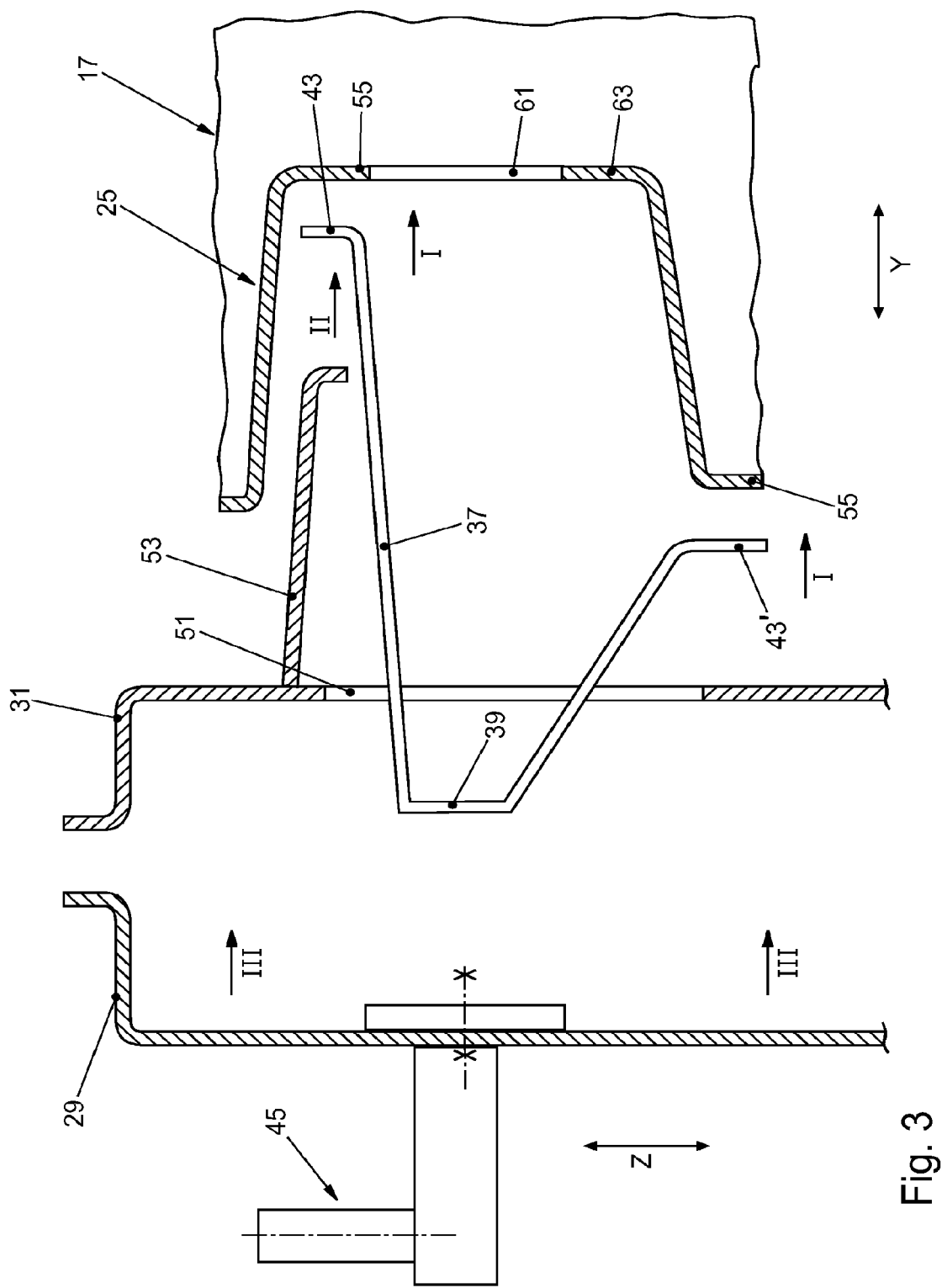
FIG. 3 shows an exploded representation of a view according to FIG. 2.
Figure 4:
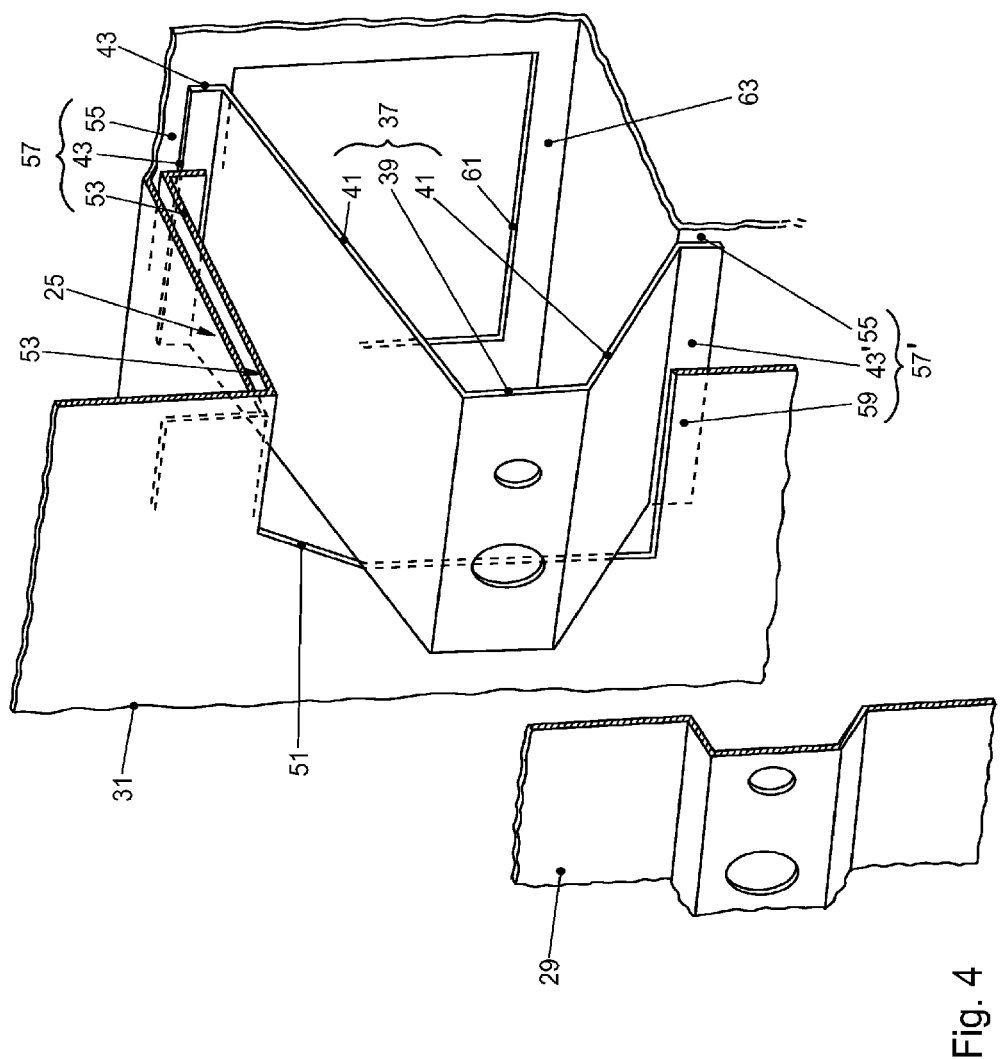
FIG. 4 shows a greatly enlarged perspective representation of a sheet metal part connection, which corresponds to the sheet metal part connection shown in FIG. 2.

According to FIGS. 2 through 4, tension element 37 is a groove-shaped sheet metal component in profile, which has a groove base 39 and two raised side walls 41. Angled edge flanges 43 adjoin side walls 41 to the outside in each case. In the assembled position, edge flanges 43 and 43' each form inner ends of tension element 37, while groove base 39 forms the outer end of tension element 37 in vehicle transverse direction y.

In FIG. 2, inner end 39 of tension element 37 is connected to a hinge element 45 for the motor vehicle door by a screw connection 49, a reinforcing plate and external sheet metal molded part 29 being inserted therebetween. In contrast, the two side walls 41 of tension element 37 extend from cavity 36 of A pillar 12 in vehicle transverse direction y through a feed-through opening 51 in internal sheet metal molded part 31 to hollow connecting profile 25 of transverse assembly 17 which is pot-shaped according to FIG. 2, as an example. A corresponding connecting profile 53 of A pillar 12 extends into pot-shaped connecting profile 25 of transverse assembly 17. Upper edge flange 43 of tension element 37 shown in FIG. 2 is placed in a form-locked manner between connecting profile 53 of A pillar 12 and a flange section 55 of connecting profile 25 of transverse assembly 17. This results in a three-layer structure 57, in which upper edge flange 43 of tension element 37 is fastened between A pillar connecting profile 53 and a flange section 55 of transverse assembly 17 in a form-locked manner in vehicle transverse direction y. Lower edge flange 43' of tension element 37 in FIG. 2 is integrated into a corresponding three-layer structure 57'. As a result, lower edge flange 43' engages with an opening edge 59 of feed-through opening 51. Lower edge flange 43' is therefore situated in a form-locked manner between opening edge 59 and additional flange section 55 of connecting profile 25 of transverse assembly 17.

The assembly operation for assembling the sheet metal part connection shown in FIG. 2 is illustrated on the basis of FIG. 3. Accordingly, tension element 37, together with its two edge flanges 43 and 43', is welded to flange sections 55 of transverse assembly connecting profile 25 in a first assembly step I.

In subsequent assembly step II, connecting profile 53 of A pillar 12 is inserted into transverse assembly connecting profile 25 and fastened thereto by a welded, adhesive and/or screw connection. Outer end 39 of tension element 37 is fed through feed-through opening 51 of internal sheet metal molded part 31, while edge flanges 43 and 43' of tension element 37 are simultaneously placed in a form-locked manner between inner sheet metal molded part 31 and flange sections 55 of transverse assembly 17.

In subsequent assembly step III, external sheet metal molded part 29 is connected to internal sheet metal molded part 31 by a flange joint 35. In addition, outer end 39 of tension element 37 is screwed to hinge element 47 via access opening 61 in pot base 63 of transverse assembly connecting profile 25. For the sake of better understanding, the sheet metal part connection shown in FIGS. 2 and 3 is illustrated in FIG. 4 in a perspective partial sectional representation as well as with detached external sheet metal molded part 29.

The following process therefore occurs in a vehicle crash which may be carried out in FIG. 1:

Due to the impact surface, which is largely located outside longitudinal member 7, the force is applied past bumper cross member 5 directly to the side body top shell and on to left front wheel 9 in FIG. 1, which faces the crash. During the further course of the crash, the rim of front wheel 9 is pressed backward under force F illustrated in FIG. 1 against A pillar 12, in particular its A pillar nodes 11, where force F is applied to side skirt 13 located therebehind as well as to vehicle door 34. Flange joint 35 of A pillar 12 is thus subjected to a tensile load, in which opposing tensile forces $F_Z$ (FIG. 2) act in transverse direction y.

Tension element 37 is provided to prevent the tensile load from causing flange joint 35 from breaking apart. Tension element 37 is, on the one hand, connected by a screw connection to external sheet metal molded part 29 and, on the other hand, situated in a form-locked manner between transverse assembly 17 and A pillar 12 via three-layer structure 57. In this manner, flange joint 35 is safely strain-relieved in the event of a crash, thereby reliably preventing A pillar 12 from breaking apart.

Figure 5:
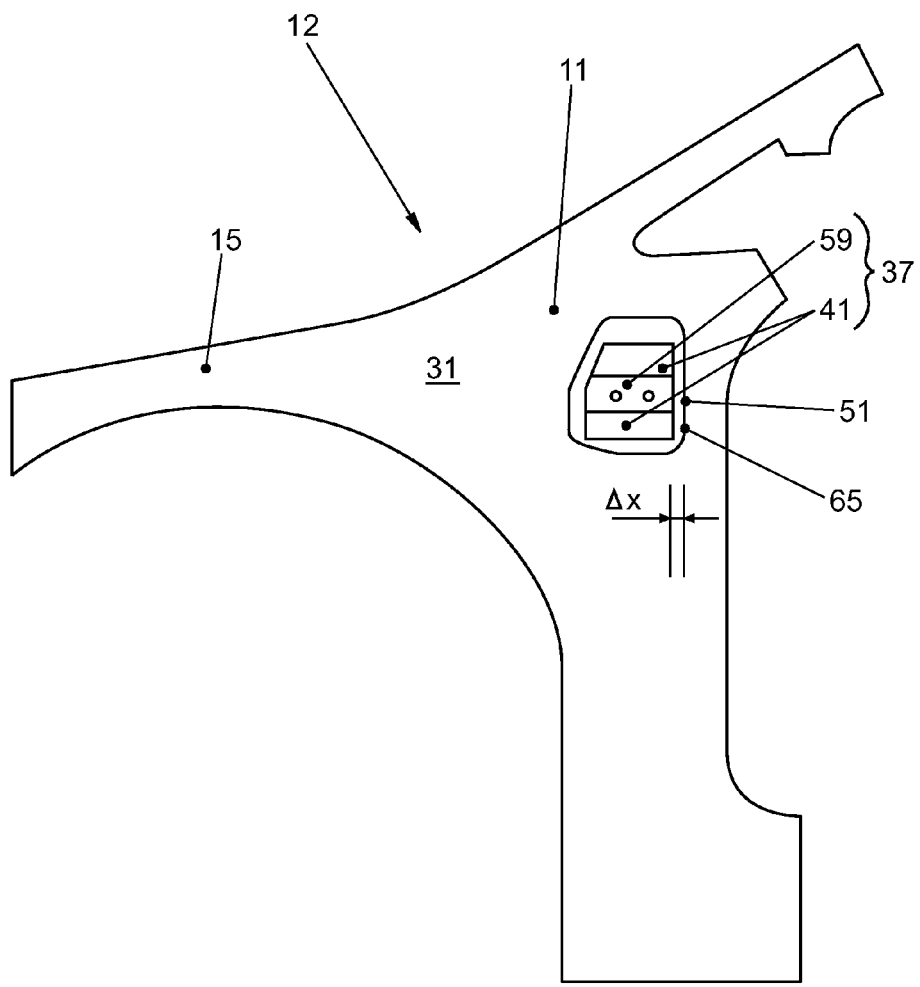
FIG. 5 shows a side view of an internal sheet metal molded part of an A pillar, which has a tension element extending through a feed-through opening of the A pillar.

According to FIG. 5, tension element 37 is guided with only a slight clearance Δx through feed-through opening 51 of internal sheet metal molded part 31 in vehicle longitudinal direction x. This means that, during the further course of the crash, tension element 37 is pressed into contact with an edge 65 (FIG. 5) of feed-through opening 51 until clearance Δx is filled, making it possible to apply additional collision forces to internal sheet metal molded part 31 as well as to transverse assembly 17.

The invention claimed is:

1. A front end for a vehicle having diametrically opposed A pillars in the vehicle transverse direction (y), each A pillar having an internal sheet metal molded part and an external sheet metal molded part connected to each other via edge flange joints and additionally connected to at least one tension element, said tension element comprising:
    an outer end in the vehicle transverse direction (y) connected to a hinge element mounted on the external sheet metal molded part and additionally connected to an inside of the external sheet metal molded part; and
    at least one inner end connected to the internal sheet metal molded part, and additionally fastened between the internal sheet metal molded part of the A pillar and a counter-holder in at least one three-layer structure, the at least one inner end being fed through a feed-through opening of the internal sheet metal molded part and engages with the internal sheet metal molded part;
    wherein the tension element is fed with a clearance (Δx) through the feed-through opening of the internal sheet metal molded part in the vehicle longitudinal direction (x), and, in the event of a crash, the tension element is pressed in until the clearance (Δx) is filled and the tension element strikes an edge of the feed-through opening of the internal sheet metal molded part.

2. The front end as recited in claim 1, wherein the tension element strain-relieves the flange joints of the A pillar in the event of an accident-induced tensile or shear load ($F_Z$) and prevents the flange joints from breaking apart.

3. The front end as recited in claim 1, wherein the tension element is situated in a cavity between the internal and the external sheet metal molded parts of the A pillar.

4. The front end as recited in claim 1, wherein the counter-holder is situated outside a cavity defined between the internal sheet metal molded part and the external sheet metal molded part.

5. The front end as recited in claim 1, wherein the counter-holder is an integral part of a connecting profile of a transverse assembly, which extends between the two A pillars and is connected to a corresponding connecting profile on the internal sheet metal molded part.

6. The front end as recited in claim 5, wherein the counter-holder is a flange section of the connecting profile of the transverse assembly, and the inner end of the tension element, in particular, is situated between the flange section and the internal sheet metal molded part.

7. The front end as recited in claim 5, wherein the inner end of the tension element is welded to the counter-holder, and the internal sheet metal molded part is brought into contact with the at least one inner end of the tension element, forming the three-layer structure, or the internal sheet metal molded part is connected by a screw or welded connection to the inner end of the tension element.

8. The front end as recited in claim 1, wherein the tension element is a sheet metal molded part whose inner and outer ends are each angled edge flanges, or the tension element is a groove-shaped component having a groove base which forms the outer tension element end and having side walls whose angled edge flanges form the inner tension element ends.

9. The front end as recited in claim 5, wherein the inner end of the tension element is welded to the counter-holder, and the internal sheet metal molded part is brought into contact with the at least one inner end of the tension element, fowling the three-layer structure, and the internal sheet metal molded part is connected by a screw or welded connection to the inner end of the tension element.

10. The front end as recited in claim 1, wherein the tension element is a sheet metal molded part whose inner and outer ends are each angled edge flanges, and the tension element is a groove-shaped component having a groove base which forms the outer tension element end and having side walls whose angled edge flanges form the inner tension element ends.

* * * * *